United States Patent [19]
Larson et al.

[11] Patent Number: 5,863,017
[45] Date of Patent: Jan. 26, 1999

[54] STABILIZED LASER PLATFORM AND MODULE INTERFACE

[75] Inventors: Donald Glenn Larson; Anthony John deRuyter, both of San Diego; Curtiss Lynn Mixon, Encinitas; Jerry Rudy Gerent, Vista, all of Calif.

[73] Assignee: Cymer, Inc., San Diego, Calif.

[21] Appl. No.: 583,380

[22] Filed: Jan. 5, 1996

[51] Int. Cl.[6] .................................................. F16M 11/00
[52] U.S. Cl. ........................ 248/176.1; 248/676; 248/678
[58] Field of Search .................................. 248/176, 139, 248/146, 550, 179.1, 180.1, 278.1, 678, 638, 676; 372/107, 108, 109

[56] References Cited

U.S. PATENT DOCUMENTS

| | | | |
|---|---|---|---|
| 4,534,047 | 8/1985 | Deschenaux et al. | 378/35 |
| 4,719,641 | 1/1988 | Muller et al. | 372/109 |
| 4,760,583 | 7/1988 | Sasnett et al. | 372/107 X |
| 5,040,953 | 8/1991 | Tinsler | 248/638 X |

FOREIGN PATENT DOCUMENTS

| | | |
|---|---|---|
| 0 288 265 A1 | 10/1988 | European Pat. Off. . |
| 39 17 408 A | 12/1989 | Germany . |
| 43 13 675 C1 | 5/1994 | Germany . |

OTHER PUBLICATIONS de Boer et al., "Ein SchwingungsisolierterMeBtisch mit Niveau–Regelung," *Feinwerktechnik & Messtechnik,* vol. 88, No. 5 (Aug. 1980) pp. 233–236 .

*Primary Examiner*—Ramon O. Ramirez
*Attorney, Agent, or Firm*—David J. Power

[57] ABSTRACT

A laser system support structure is provided having an independent, kinematically mounted chamber and optics platform. Swivel-type mounts are used to couple the platform at three points to the laser support frame, thereby allowing the platform to remain static while the support frame, via the swivel mounts, deflects around the platform in response to external forces. The independent platform design provides secondary benefits of creating a compartmentalization of laser system components, leading to a modular type design. Each laser system module is mounted to the support structure on an extension rail, to allow removal of the module from the support frame for easy access during servicing.

16 Claims, 4 Drawing Sheets

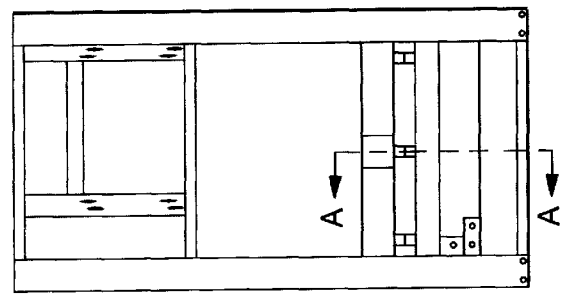
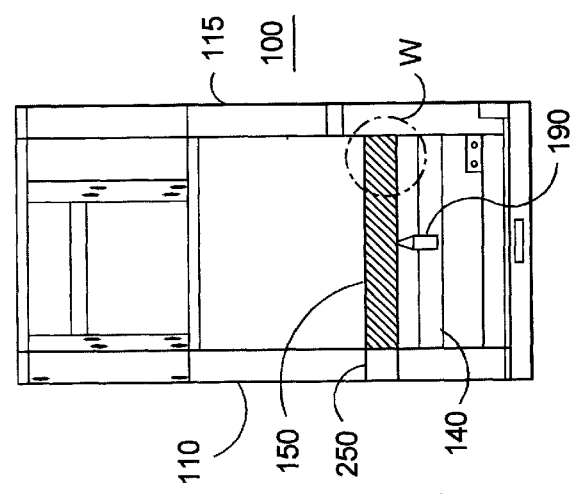
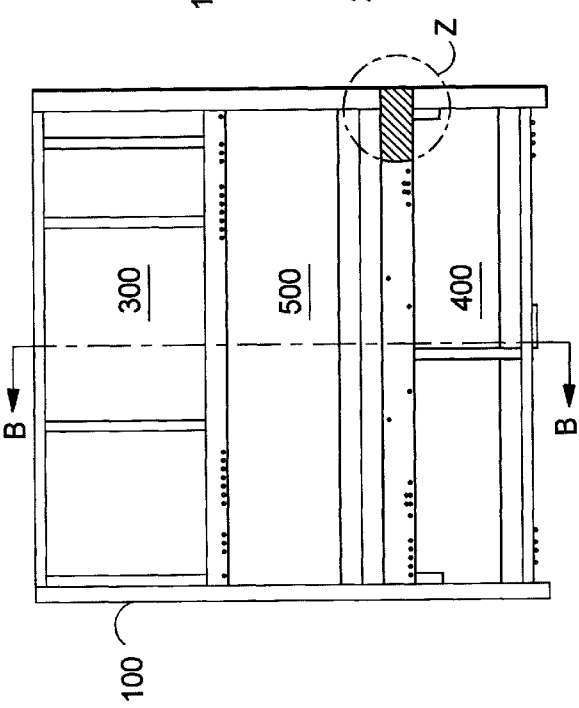
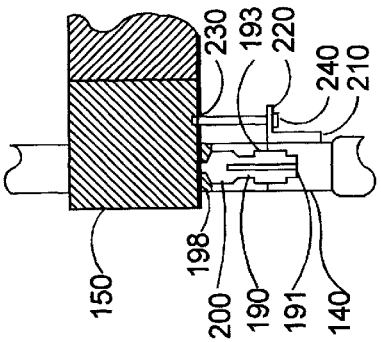
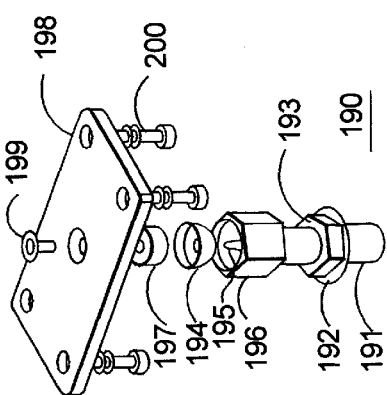

STABILIZED LASER PLATFORM AND MODULE INTERFACE

FIELD OF THE INVENTION

This invention relates to apparatus used to provide stable operating platforms for sensitive instrumentation and particularly to a stable mounting platform for laser systems and their accompanying optical interface components, while additionally facilitating a modular, compartmentalized design for serviceability and safety.

BACKGROUND OF THE INVENTION

The speed of today's high-speed performance digital computers is dependent both on the speed of the IC chip and the compactness of the package on which the chip is mounted. The package connects the signals between the chips, provides power and cooling capability, as well as providing interconnects to other parts of the computer. By making the packaging circuits smaller, the signals have less distance to travel which translates into reduced processing time. As circuits get smaller, the way they are fabricated and the accuracy with which they have to be positioned becomes more challenging. Micro lithography for advanced ULSI fabrication is currently making a transition from using an i-line (365 nm) mercury lamp to a deep-UV excimer laser, primarily krypton fluoride (KrF), having a wavelength of 248 nm, as the illumination source. The KrF excimer laser is expected to become the primary exposure tool for printing sub-0.4 $\mu$m design rule features in IC manufacturing, while Argon fluoride (ArF) with its 193 nm wavelength, is expected for use in sub-0.25 $\mu$m design features.

In the micro lithography process, wafer steppers utilize precision positioning tables with interferometers and CCD optical recognition to provide accurate placement of design patterns in silicon wafers. The wafer is generally automatically loaded from a cassette into a wafer holder where it is automatically leveled, focused, and aligned to the mask. Each pattern on the part has to be overlaid with a defined accuracy on a previously-defined pattern. One pattern may be used as the mask for each part, wherein the excimer laser acts as a projection ablation tool to form the vias which interconnect the wiring levels of the circuit As the pattern changes, the mask is changed as the step-and-repeat process continues. These vias must be placed precisely on the features defined at the previous level, making the accuracy of the laser system critical. This accuracy can be affected by lens distortion, tool-to-tool errors, and particularly by alignment mark errors. Because of the increasingly smaller design rule features being required in the industry, changes in beam profile and direction cannot be tolerated as the result of misalignment or external forces acting to destabilize the alignment accuracy of the laser-stepper system.

Referring to FIG. 1, an example of a laser system support structure 10 of conventional design is shown, having a horizontal support frame 20 and rail cross members 30. The optical platform (not shown) and the laser system components mounted thereon are typically mounted on rail cross members 30 and supported equally by internal panel 35 and vertical frame members 40, which are tied into support frame 20 by brackets 45, shown in the closeup labeled A. Beam delivery interface mount 50, used to couple and hold the laser system to the wafer stepper's beam delivery equipment in a precise and stable manner, is generally mounted to frame 20 since, in this conventional design, this member is the most robust and will provide the most rigid support However, if a force F is applied to vertical frame member 40, a deflection in the frame occurs so that members AB and CD are biased in the direction of the acting force. As a result, interface mount 50 is likewise deflected due to its dependent mounting relationship with vertical frame members 40 via horizontal support frame 20 and brace 45. Because of the required alignment precision, even small vibrational forces acting on structure 10 in a manner as previously described, can adversely affect beam accuracy.

SUMMARY OF THE INVENTION

An object to the present invention is to provide a support structure design in which the optical platform is a primary and independent structural element of the laser frame, and the beam delivery interface is an integral component of the optical platform.

It is a feature of the present invention to provide only three attachment points to couple the optical platform to the laser frame, wherein each attachment point is a swivel joint to prevent bending of the platform.

It is still another feature of the present invention that all optical systems, as well as the laser chamber and its associated components, are mounted on the platform and will move together, thereby maintaining alignment when acted upon by a disturbing force.

It is another object of the present invention to provide a modular compartmentalized design to facilitate serviceability and enhance safety.

It is another feature of the present invention to utilize rail mounted, hinged modules to house system components in each compartmentalized area to allow serviceability from a single vantage point.

The objects and features of one aspect of the present invention are realized by the use of an independent support platform for the laser's chamber and optical system. The support platform is swivel-mounted to the laser's support frame by a ball-cup joint at only three attachment points at the base of the laser support frame. Each of the attachment points are threaded to allow the support platform surface to be adjusted to a measured level orientation once the chamber and optical systems are mounted. The use of only three attachment points provides a three point kinematic mount that ensures that the support platform will not undergo a deformation if the laser's support frame is subjected to an outside force. Instead, the entire platform will move, and because the optical system and the beam delivery interface are integral to the support platform, they will likewise move in the swivel joints an equal amount maintaining a level orientation, thereby maintaining the optical alignment.

Another aspect of the invention resulting from the use of an independent platform for the laser's chamber and optical system is the use of modular-subsystems and overall compartmentalization of these subsystems into three horizontal levels: utility, chamber/optics and electrical; thereby facilitating safety and maintenance by segregating the cooling subsystems from high voltage areas and allowing all servicing tasks to be performed from the front side alone via extension rails and hinged mounts to allow easy access to each of the laser's subsystem modules.

BRIEF DESCRIPTION OF THE DRAWINGS

FIG. 2b depicts a front view of a laser support frame incorporating the optical platform of the present invention.

FIG. 2c depicts a first end view of the laser support frame shown in FIG. 2b along section line B—B.

FIG. 2d depicts a second end view of the laser support frame shown in FIG. 2b.

FIG. 3a depicts an exploded view of the ball-cup joint arrangement used at each of the three optical platform-laser support frame attachment points.

FIG. 3b depicts a cut-away view of the ball-cup attachment to the laser support frame along section lines A—A of FIG. 2d.

DETAILED DESCRIPTION OF THE INVENTION

Figure 2A:
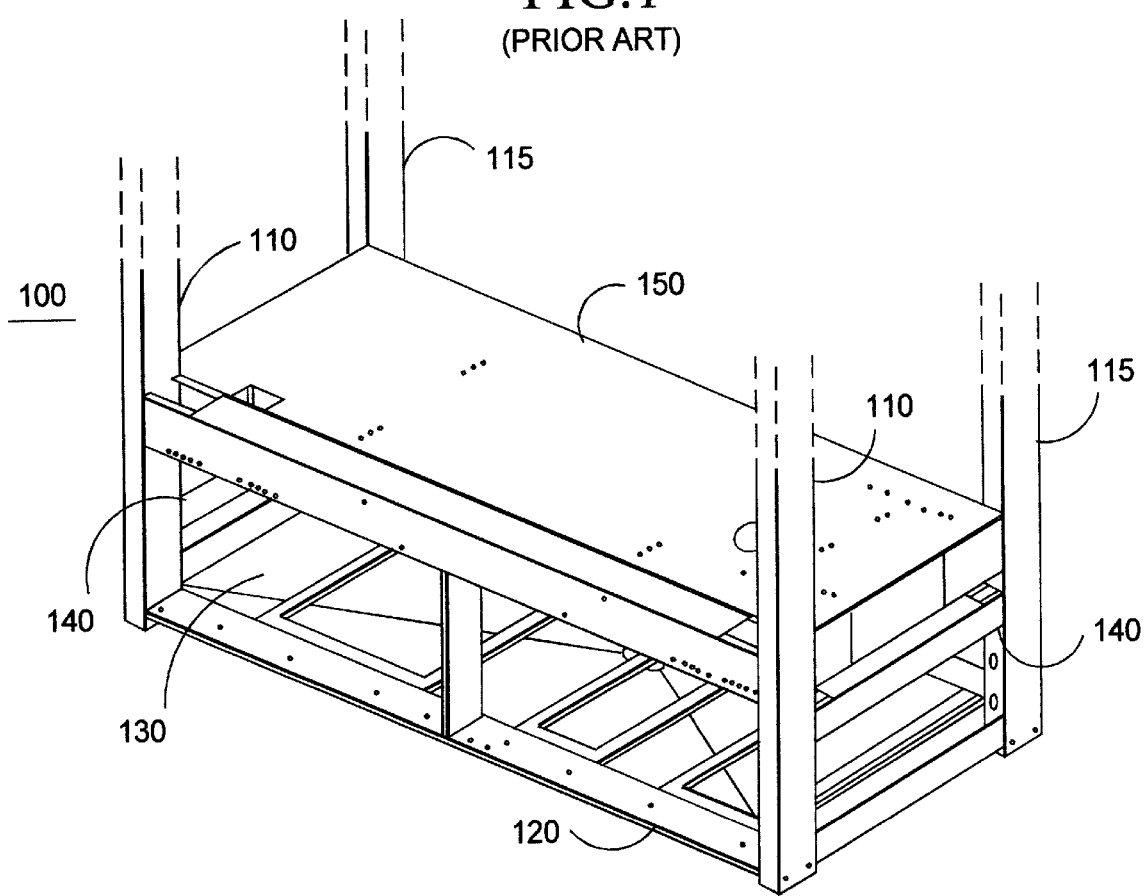
FIG. 2a depicts the optical platform of the present invention incorporated in a laser frame support structure.

Referring now to FIG. 2a, a laser support frame 100 is shown having vertical frame support members 110 and rear vertical frame support members 115, along with a frame support base 120. Internal base support members 130 are also shown and are recognized by those skilled in the art as necessary to provide structural integrity to support base 120. Horizontal brace member 140 is rigidly mounted between vertical frame support members 110 and 115 and provides support for chamber/optics platform 150. Chamber/optics platform 150 is designed to provide a rigid, stable base support for the laser chamber and optics modules and is preferably constructed utilizing a stainless steel honeycomb internal structure sandwiched between stainless steel plates to minimize overall system weight and still provide required rigidity. However, as those skilled in the art will recognize, platform 150 may be constructed of any material sufficient to provide the operational rigidity required.

Figure 4:
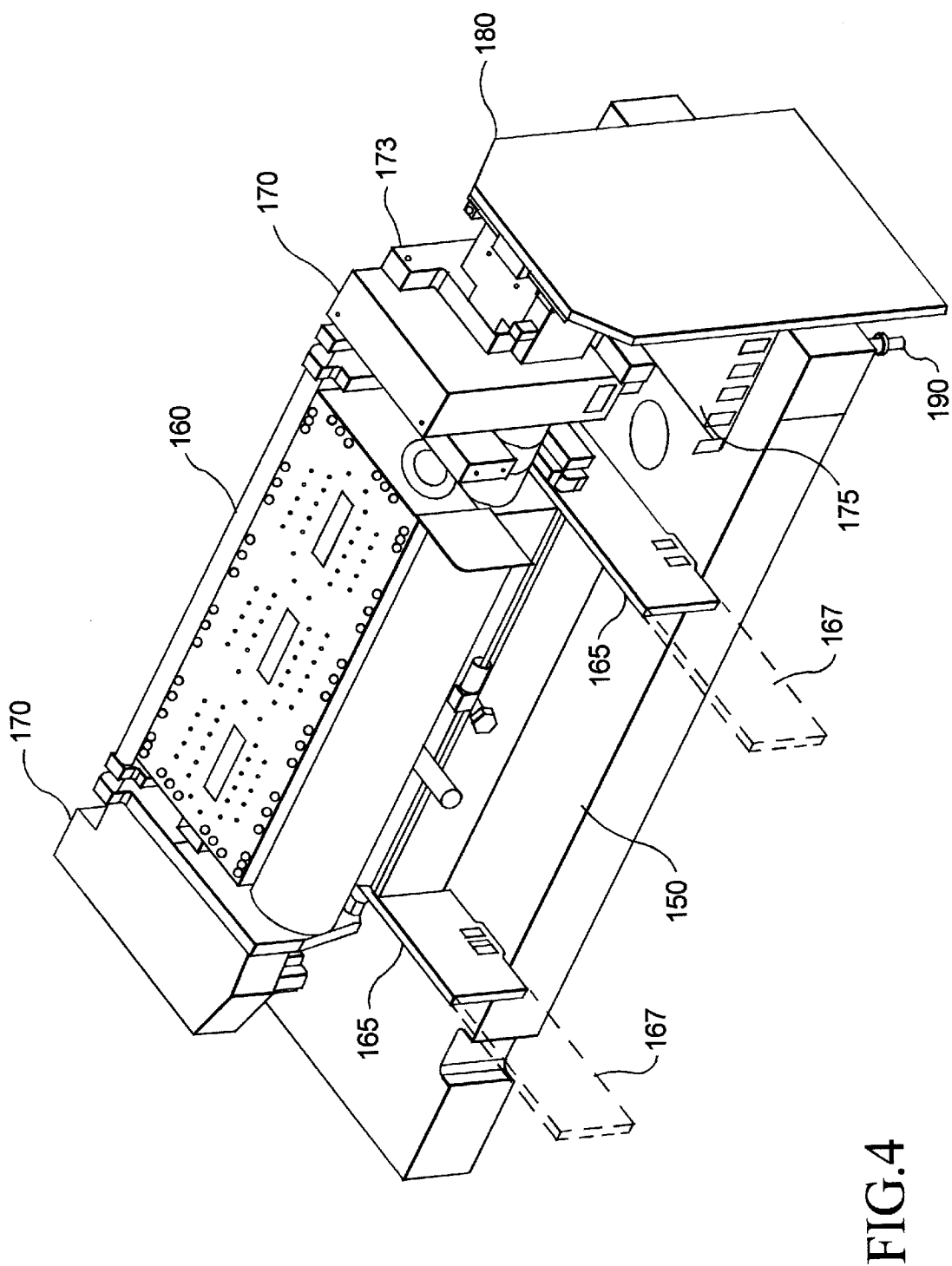
FIG. 4 depicts the optical platform of the present invention isolated from the laser support frame, showing the laser's optical system and chamber mounted thereon.

Referring now to FIG. 4, chamber/optics platform 150 is shown detached from laser support frame 100 of FIG. 2a, having laser chamber 160, mounted on support rails 165 to allow the chamber to be laterally rolled to facilitate maintenance, and optics modules 170 mounted on bracket 173. Support rails 165 preferably incorporate a rail extender mechanism (not shown), such a those well known in the art, and similar in design to the module slides described infra, to allow laser chamber 160 to be extended beyond the outer perimeter of support frame 100, out of axial alignment with optics module 170, as shown by extension lines 167, to provide easy access to the optics module and other chamber interface components.

Also shown in FIG. 4, mounted on chamber/optics platform 150, via interface plate 175, is beam delivery interface mount 180. Chamber/optics platform 150 is securely attached to horizontal brace 140 in a three point kinematic mount shown in FIG, 2b and 2d by a ball-cup joint 190 at each of the three points.

It is to be noted that chamber/optics platform 150 was previously described herein as being preferably constructed from a stainless steel honeycomb structure sandwiched between stainless steel plates to minimize weight and still provide the required platform rigidity. Even with the platform's weight so minimized, the loading of the laser's chamber and optics components provides the platform with sufficient mass to render insignificant the constraints on the linear degrees of freedom imposed by the ball-cup type joint Those skilled in the art will appreciate that if the operational and design requirements dictate the need for a chamber/optics platform whose total mass is such that thermal or other stresses are not rendered insignificant and which would affect the platform's stability as a result of the constraints imposed by the ball-cup joint described herein, that modifications at each point can be made to free movement along the required degree of freedom. For example, with one of the three points fixed by a ball-cup joint as described herein, the second and third mounts could incorporate a cup and roller combination or a "V" groove to allow movement along the line segments which define the isosceles triangle created by the attachment points. Those skilled in the art will recognize that these alternative mounts are only two examples of attachment methods which would allow the chamber/optics platform to move along the required degrees of freedom in reaction to thermal or other forces, and that other equivalent arrangements are available.

Referring now to FIG. 3a, ball-cup joint 190 is shown as an exploded close-up, comprising a threaded shaft 191 leveling means, and locking device comprising a washer 192 and jam nut 193 threaded onto shaft 191. Cup element 194 is mounted on floating pin 195 housed in cup housing 196. Washer 197 is mounted inside cup element 194 atop floating pin 195 to provide support for the cup element when cup housing 196 and pin engagement screw 199 are threaded into engagement with flange 198 and floating pin 195 respectively. Bolts 200 secure flange 198 to the underside of chamber/optics platform 150 (not shown).

FIG. 3b, showing ball-cup joint mounting along section lines A—A of FIG. 2d, depicts threaded shaft 191 of ball-cup joint 190 in threaded engagement with horizontal support 140 and flange 198 coupled to chamber/optics platforms 150 by bolts 200. Coupled to the interior side of horizontal support 140, and paired with each ball-cup joint 190 at each of the three positions, is secondary support brace 210, having a load bearing face 220 coupled to chamber/optics platform 150 via tension rod 230. In their cooperative arrangement, chamber/optics platform 150 is adjusted to a level position via threaded shaft 191 on each of the three ball-cup attachment points, and tension rod 230 is then secured into spring biased engagement with load bearing face 220 by support nut 240 having a spring washer (not shown) to maintain rod 230 in tension and provide enhanced stability to the chamber/optics platform. This arrangement acts to prevent platform 150 from lifting out of the ball-cup attachment by use of tension rod 230, while also absorbing vibrational and other farces via the spring washer. Preferably, two of the three ball-cup joint/secondary support brace mount pairs are positioned under the beam output end of chamber/optics platform 150 in an isosceles configuration to provide additional support for beam delivery interface mount 180 and the increased load resulting from the coupling of the laser system to the beam delivery equipment of the stepper.

Figure 1:
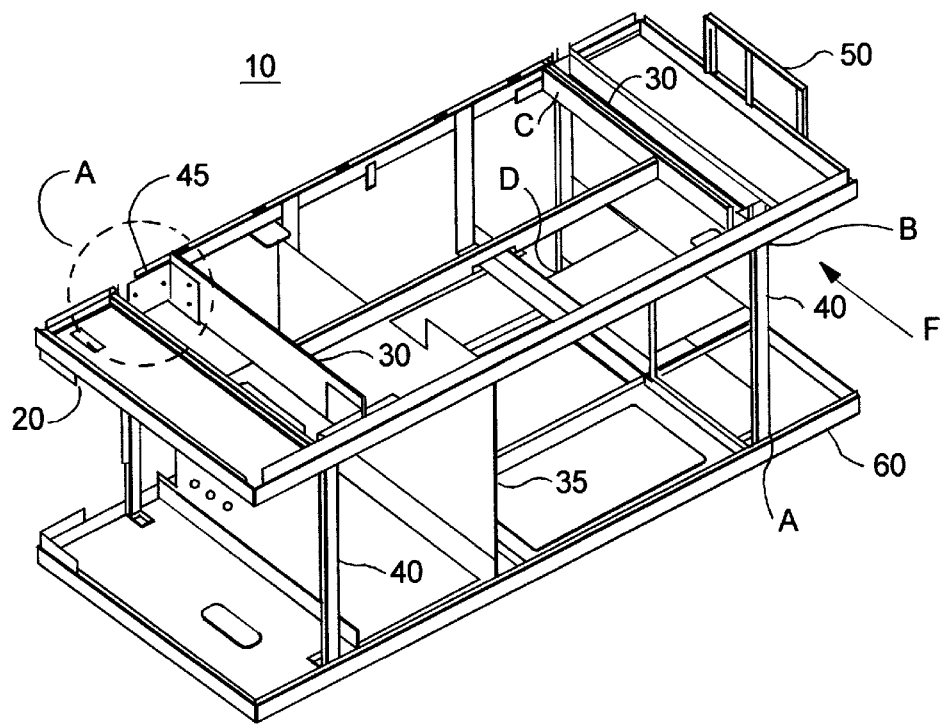
FIG. 1 depicts a laser frame and optical support arrangement of conventional design, well-known in the prior art.

Referring now to FIG. 2c, a first end view of laser support frame 100 across section B—B of FIG. 2b is shown, wherein the third of the three-point independent support feature of optics platform 150 is represented. Ball-cup joint 190 is attached to horizontal support 140 as previously described, providing the only attachment points between support frame 100 and chamber/optics platform 150. Frame divider channel 250 provides structural support for laser frame 100, being positioned on each side of chamber/optics platform 150, coupling together respectively front vertical frame supports 110 and rear vertical frame supports 115. This arrangement allows a maintaining of the structural integrity of laser frame 100 while, at the same time, segregating chamber/optics platform 150 as shown in highlighted section W. As a result of the three-point independent support feature of chamber/optics platform 150 and the integration of beam delivery interface mount 180 with chamber/optics platform 150, the laser support frame can be subjected to external force loads, as previously described in the prior art design of FIG. 1, and still maintain alignment precision. When such a force is applied, support frame 100 will deflect in the same manner as the prior art design; however, because chamber/optics platform 150 is independently supported by ball-cup joints 190, the ball-up socket will rotate in response to the frame deflection while chamber/optics platform 150 remains undeformed. As a result, laser chamber 160, optics module 170, and the externally coupled beam delivery equipment, via beam delivery interface mount 180, are all maintained in stasis with beam alignment precision preserved. While the preferred embodiment has been described herein utilizing a ball-up pivoting mount, those skilled in the art will recognize that other attachment means as previously discussed, which allow the chamber/optics platform to pivot independently with respect to the laser frame, may be used to accomplish the preservation of beam alignment as described herein.

A secondary advantage of the platform of the present design is the modular design and compartmentalization of laser subsystems into three horizontal levels. Referring again to FIG. 2b, the upper level 300 is dedicated to hold all high voltage/electric subcomponents such as the pulse power module (not shown), while the lower level 400 is dedicated to utility subsystems such as water cooling and gas distribution modules (not shown). As previously described, middle level 500 is dedicated to the chamber and optics components and is supported by the swivel mount, three-point support platform specifically described above. This modular and compartmentalized design provides two distinct advantages; the first being the safety feature of separating the water coolant systems from the high voltage areas; and the second being the ability to service the laser from the front side only, thereby allowing permanent panels (not shown) to be fitted for enclosing laser frame 100 on all other sides.

Figure 5A:
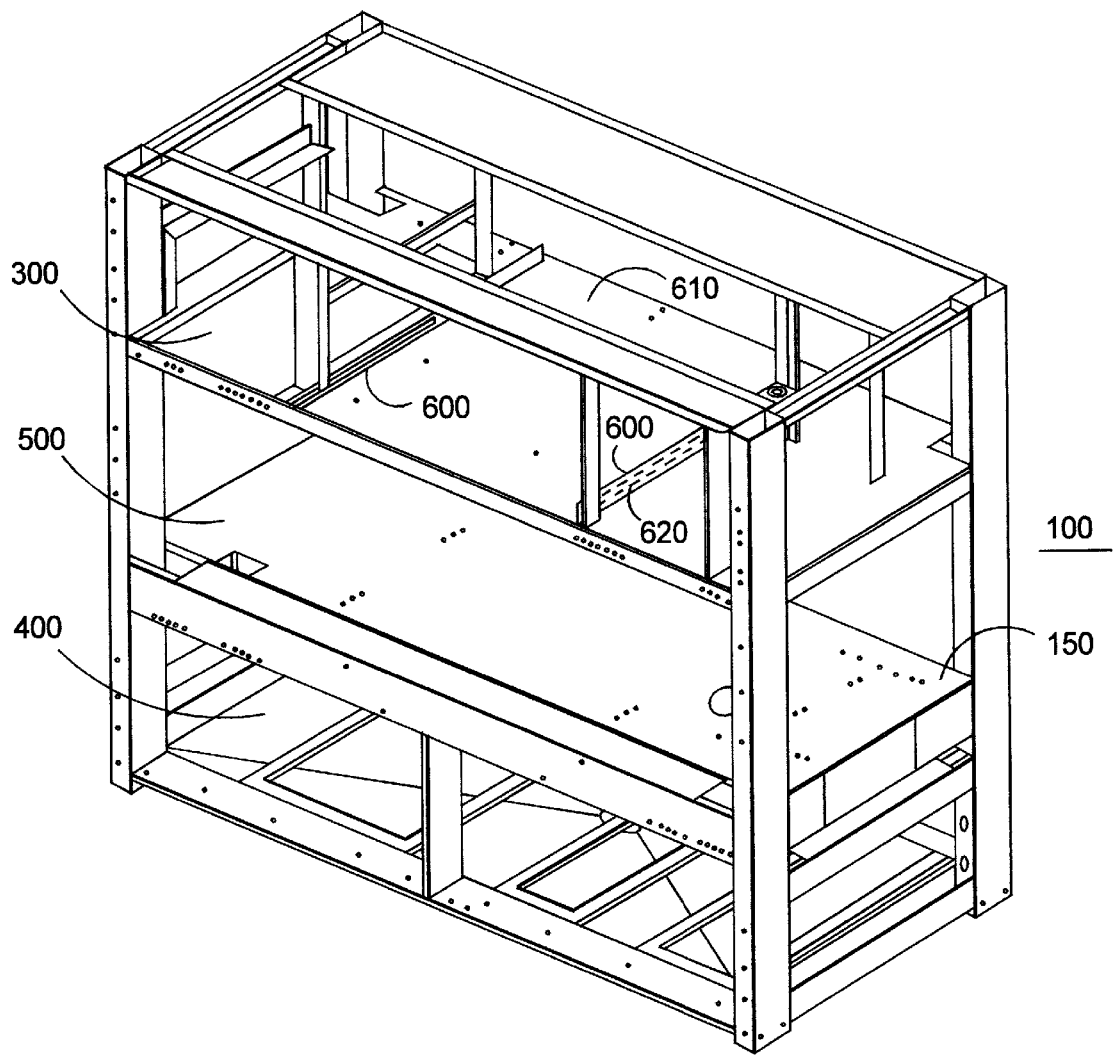
FIG. 5a depicts the laser frame of the present invention, having a compartmentalized, slide-modular subsystem design.
Figure 5B:
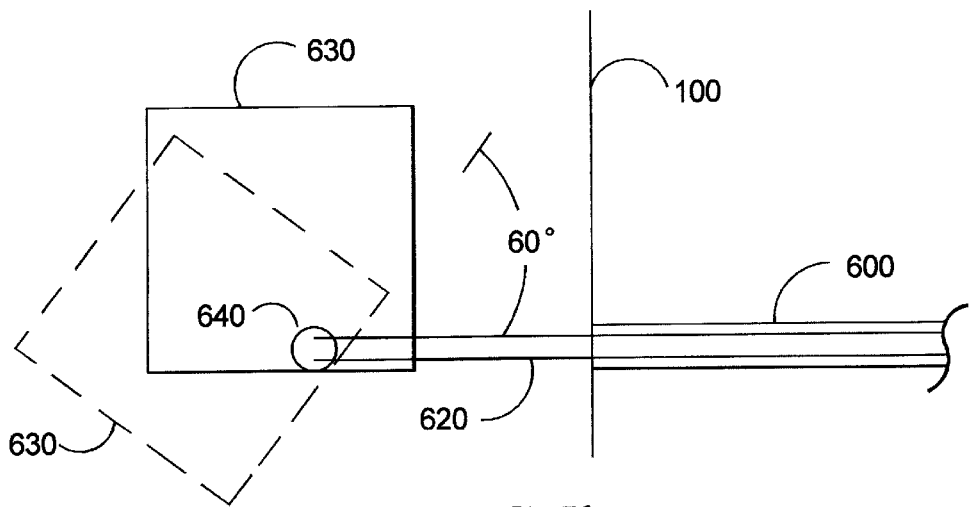
FIG. 5b depicts a representative modular subsystem having the sliding-hinge feature of the present invention.

Referring now to FIG. 5a, preferably the modular subcomponents for each level are mounted on slides 600, such as those generally available from companies such as General Devices, Jonathan and others. The operation and installation of slides of this type are well known, with the fixed portion being mounted to the laser frame via horizontal support plates, such as plate 610, and the moving (slide) portion 620 being affixed to the laser module to allow the specific module to be laterally repositioned clear of frame 100 to allow easy access to all components. In this way, all servicing can be conducted from the front of the laser, with access available to all module surfaces. This feature is best illustrated in FIG. 5b, the preferred embodiment, wherein module 630 itself would be attached to the slide element 620 by a locking hinge 640. This locking hinge feature enhances the ability to easily service the module by allowing the module to pivot by rotating in a downward direction (as shown) about the hinge to gain easy access to the rear portion of the module and lock in various angular positions (i.e., 45°, 60°, 90°).

What is claimed is:

1. A laser system support structure comprising:
   a support base having a plurality of internal support members attached thereto;
   a plurality of vertical frame members fixedly attached to said support base, said vertical frame members interconnected to each other by a set of horizontal cross members; and
   a laser component platform comprising a plurality of swivel-type mounts mounted to said horizontal cross members to isolate said component platform from external forces acting on said support structure and allow said component platform to remain static while said swivel-type mounts react to deflections in said support structure in response to external forces.

2. The laser system support structure of claim 1 wherein each of said swivel-type mounts is a cup and roller combination.

3. The laser support structure of claim 1 wherein said swivel-type mount is a three point mount.

4. The laser system support structure of claim 3 wherein the component platform is a chamber and optics platform.

5. The laser system support structure of claim 1 wherein the component platform is a chamber and optics platform.

6. The laser system support structure of claim 5 wherein the chamber and optics platform further comprises a rail mount system mounted on said platform, wherein a laser discharge chamber is coupled in rolling engagement on said rail system, said rail system having a set of extension rails to allow said chamber to be positioned clear of the system support structure when said extension rails are fully extended.

7. The laser system support structure of claim 6 wherein a beam delivery interface mount is fixedly attached to said chamber and optics platform.

8. The laser system support structure of claim 6 wherein a beam delivery interface mount is fixedly attached to said chamber and optics platform.

9. A laser system support structure comprising:
   a support base having a plurality of internal support members attached thereto;
   a plurality of vertical frame members fixedly attached to said support base, said vertical frame members interconnected to each other by a set of horizontal cross members; and
   a laser component platform comprising a three point mount mounted to said horizontal cross members to isolate said component platform from external forces acting on said support structure.

10. The laser system support structure of claim 9 wherein the swivel-type kinematic mount is a ball and cup configuration.

11. A laser system support structure comprising:
    a support base having a plurality of internal support members attached thereto;
    a plurality of vertical frame members fixedly attached to a peripheral edge of said support base, said vertical members serially coupled by a horizontal cross member;
    a laser component platform kinematically mounted to said horizontal cross members by a swivel-type mount at three points to isolate said component platform from external forces acting on said support structure; and
    an external interface mount fixedly coupled to said laser component platform.

12. The laser system support structure of claim 11 wherein the laser component platform segregates the support structure into laser component compartments, wherein compatible laser components can be grouped together in said compartments.

13. The laser system support structure of claim 12 wherein said laser component platform is a chamber and optics platform, and said external interface mount is a beam delivery equipment interface mount.

14. The laser system support structure of claim 13 wherein compatible laser components are each housed in separate modules.

15. The laser system support structure of claim 14 wherein each module further comprises a mounting hinge, said module is pivotly mounted to said support structure by said hinge coupled to an extension rail mounted on said platform, whereby said module can be slidably withdrawn from said support structure and pivotly rotated about said hinge to allow access to all areas of said module.

16. The laser system support structure of claim 15 wherein the support structure segregates high voltage components from utility components.

\* \* \* \* \*